Figure 1:
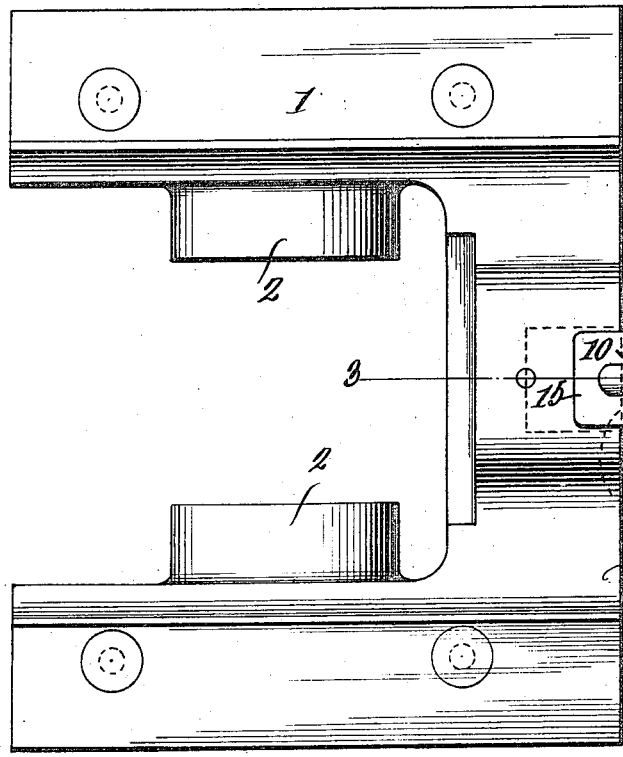
Figure 1:
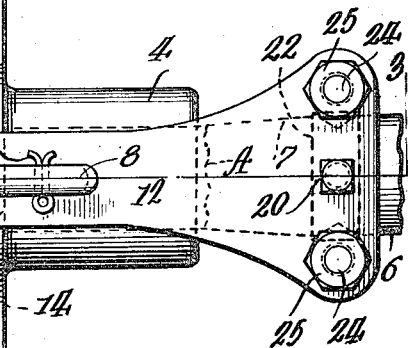

C. F. SINSABAUGH.
VALVE ROD CLAMP.
APPLICATION FILED JUNE 7, 1917.

1,268,636.

Patented June 4, 1918.
2 SHEETS—SHEET 1.

WITNESSES
W. C. Fielding.
H. H. Babcock.

INVENTOR
Charles F. Sinsabaugh
BY Richard Bowen.
ATTORNEY

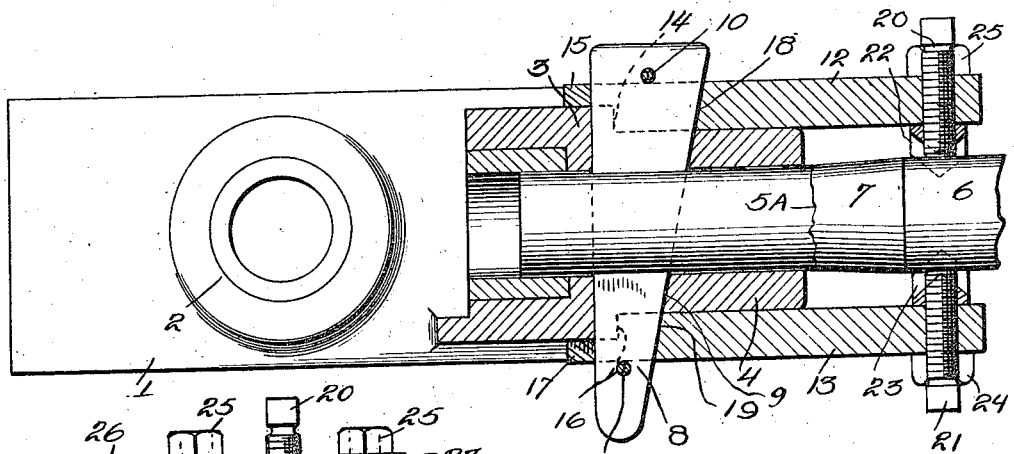
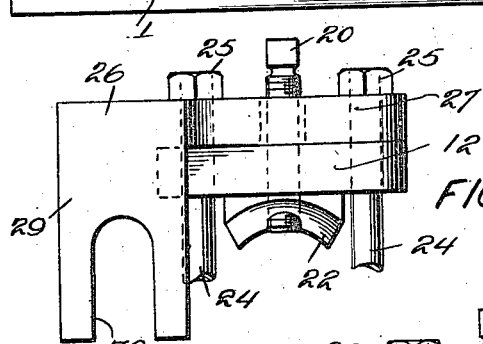
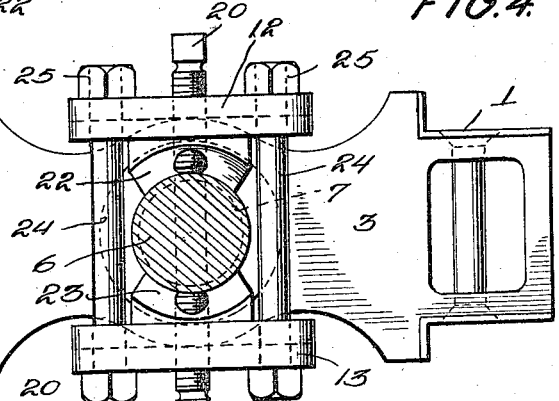
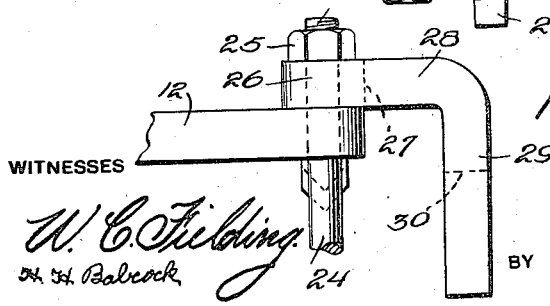

UNITED STATES PATENT OFFICE.

CHARLES F. SINSABAUGH, OF SOUTH WAVERLY, PENNSYLVANIA, ASSIGNOR OF ONE-THIRD TO CECIL A. TAYLOR, OF SAYRE, INDIANA.

VALVE-ROD CLAMP.

1,268,636. Specification of Letters Patent. Patented June 4, 1918.

Application filed June 7, 1917. Serial No. 173,338.

*To all whom it may concern:*

Be it known that I, CHARLES F. SINSABAUGH, a citizen of the United States, residing at South Waverly, in the county of Bradford and State of Pennsylvania, have invented certain new and useful Improvements in Valve-Rod Clamps, of which the following is a specification.

This invention relates to valve rod clamps, and more particularly to a clamp for temporarily repairing the valve rod for operating the valve of a locomotive steam engine.

One of the main objects of the invention is to provide a valve clamp of simple construction which may be quickly and easily applied. A further object is to provide a clamp having means for securing the same to a valve rod and to the cross-head for operating the valve rod proper. A still further object is to provide a clamp having oppositely disposed clamping jaws so shaped as to fit about and tightly grip a valve rod so as to operatively connect the same to the cross-head for reciprocating the valve, this clamp being further provided with abutments adapted to engage the edge portions of the cross-bar of the cross-head so as to transmit forward movement to the same when the eccentric rod is moved forward. Further objects will appear from the detailed description.

In the drawings:—

Figure 2:
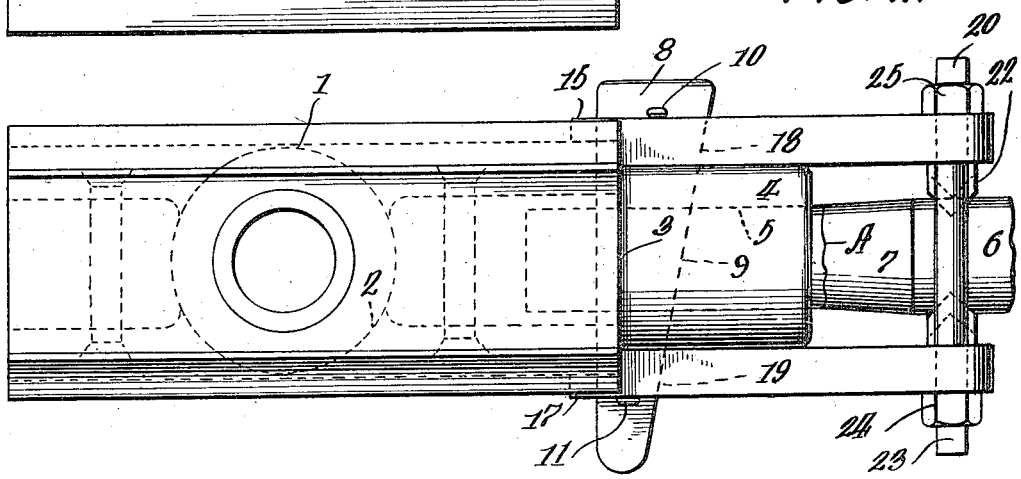

Figure 1 is a top plan view of a clamp constructed in accordance with my invention as applied, Fig. 2 is a side view of the same, Fig. 3 is a section on line 3—3 of Fig. 1, Fig. 4 is a back view of the clamp as applied, Fig. 5 is a detail of a modified form of clamp plate, and Fig. 6 is a fragmentary side view of the modified form of clamp plate illustrated in Fig. 5.

Numeral 1 designates the valve stem crosshead which is slidably mounted in suitable guides on the locomotive frame in the usual manner. This head is provided with the inwardly directed tubular sleeves or nipples 2 adapted to receive a wrist pin for pivotally securing the forward end of the eccentric rod in the head so as to cause reciprocation of the head. The cross-bar 3 of head 2 is provided with a central rearwardly directed gland or nipple 4 formed integrally therewith. This nipple is adapted to receive the reduced end portion 5 of the valve rod 6. The portion 7 of rod 6 intermediate the body of the rod and the reduced end portion 5 is tapered so as to provide a substantial frusto-conical member integral with the rod the forward end of which merges into the reduced end portion 5 of the rod a short distance in rear of the nipple 4. This point of juncture between the member 7 and the reduced portion 5 of the valve rod 6 is the point at which the rod usually breaks in the event of being subjected to unusual strains. For this reason, in constructing my clamp, I have illustrated it as used for temporarily repairing a rod which is broken closely adjacent the rearward end of nipple 4, though it will be evident that the clamp may be extended or elongated so as to repair a rod which is broken a considerable distance in rear of this member.

The reduced end portion 5 of valve rod 6 is provided with a diametrical slot which receives the tapered wedge 8. This wedge is inserted through the rod and through the slot 9 provided through nipple 4 and the cross-rod 3 for this purpose. By this means, the valve rod is connected to the cross-head 1, the device so far described being of standard construction.

The clamp is provided with an upper plate 12 and a lower plate 13. Each of these plates is of substantially T-shape. Plate 12 is reduced at the forward or base end of its stem to form an integral shoulder 14 and a forwardly extending flange 15, the shoulder and flange inclosing and engaging the upper edge portion of the cross-bar 3 of cross-head 1. Plate 13 is similarly shaped at its forward end to provide a shoulder 16 and a flange 17 which engage about the lower edge portion of the cross-bar 3. Plate 12 is further provided with a slot 18 adjacent its inner end which, when the plate is in operative position, is alined with the slot 9 of nipple 4, and bar 3, plate 13 being provided with a similar slot 19. When the wedge 8 is in operative position, it extends through the alined slots of the reduced portion 5 of rod 6, nipple 4 and plates 12 and 13, projecting a slight distance above and below the plates. A cotter pin 10 is inserted through wedge 8 above plate 12, a similar pin 11 being inserted through the wedge below plate 13. These cotter pins act to secure the wedge in position, and also serve to effectually prevent outward movement of plates 12 and 13 thus holding the shoulders of these plates in contact with the inner face of cross-bar 3 of the cross-head 1.

A set screw 20 is threaded through the head of plate 12 at the transverse center thereof, a similar screw 21 being threaded through the head of plate 13 at the transverse center thereof. An arcuate gripping jaw 22 is threaded on set screw 21 adjacent the inner face of the head of plate 12. This jaw is of substantial V-shape in transverse cross section with the apex of the V directed inwardly, and is of such curvature as to fit snugly about the body portion of valve rod 6. A similar jaw 23 is threaded on the set screw 21. These two jaws are opposed and are adapted to fit about and grip tightly the valve rod when forced into biting engagement therewith. Securing bolts 24 are inserted through the heads of plates 12 and 13 adjacent each end thereof, nuts 25 being threaded on the upper ends of these bolts above the head of plate 12. By means of the bolts 24 and nuts 25, the heads of the plates may be forced toward each other so as to force gripping jaws 22 and 23 into biting engagement with the valve rod 6.

Assuming that the rod 6 has been broken at the point of juncture between the reduced portion 5 thereof and the frusto-conical portion 7, as at A,—the plates 12 and 13 may be mounted on the cross-head 1 as above described. When the plates are thus mounted, the gripping jaws 22 and 23 will be spaced in rear of the frusto-conical portion 7 of the rod and may be forced into biting engagement with the body of the rod in the manner described thus operatively connecting the cross-head to the rod. The forward movement of the valve rod will be taken from the cross-head through plates 12 and 13 and, also, through the body of the rod and the reduced portion 5. The rearward movement of the rod will be effected by the cross-head through plates 12 and 13, wedge 8, gripping jaws 22 and 23, and set screws 20 and 21. As the jaws 22 and 23 are threaded on the set screws 20 and 21, respectively, the distance apart of these jaws may be readily adjusted, by threading the jaws onto the set screws toward or away from the inner faces of the plates, so as to accommodate valve rods of different diameters or thicknesses. This clamp may be readily applied and eliminates all necessity of dismantling or disassembling the valve gear, such as is necessary to repair a valve rod under ordinary conditions. The clamp serves as a temporary securing means for operatively connecting the valve rod to the cross-head 1 of the valve stem so as to permit the locomotive to be operated under its own power so as to return to the repair shops where it may be provided with a new rod.

In Figs. 5 and 6 of the drawings I have shown a modified form of the device for operatively connecting the clamp to the cross-head. A securing member 26 is mounted on plate 12. This member is provided with an arm 27 having an aperture at each end to receive the securing bolts 24, a rearwardly directed arm 28, and a downwardly directed arm 29 at the rearward end thereof. Arm 29 is provided with a vertical slot 30 which is adapted to receive a fastening member which may be formed integrally with, or secured on, nipple 4. In practice, plate 13 would be positioned beneath plate 12 and provided with a securing member similar to member 26, but disposed oppositely thereto. By this means, the two plates would be secured to nipple 4 so as to transmit the rearward movement of the valve rod 6 to cross-head 1, thus avoiding the necessity of providing slots through the inner ends of the plates for the reception of wedge member 8. The operation of this modified form of clamp is the same as the form just disclosed and need not, therefore, be described in detail.

What I claim is:—

1. In clamping means, spaced clamping plates each provided at one end with an abutment adapted to engage the cross-bar of a cross-head, opposed gripping jaws carried at the other end of said plates adapted to fit about and grip tightly a rod inserted between the same, and means for forcing said plates toward each other.

2. In clamping means, spaced clamping plates each provided at one end with an abutment adapted to engage the cross-bar of a cross-head, opposed arcuate gripping jaws carried at the other end of said plates adapted to fit about and grip tightly a rod inserted between the same, said jaws being of approximately V-shape in cross-section and having their apexes directed inwardly to provide gripping edges for biting into and gripping tightly a rod positioned between said jaws, and means for forcing said plates toward each other.

3. In clamping means, spaced clamping plates each provided at one end with an abutment adapted to engage the cross-bar of a cross-head, opposed arcuate gripping jaws carried at the other end of said plates adapted to fit about and grip tightly a rod inserted between the same, said jaws being of approximately V-shape in cross-section and having their apexes directed inwardly to provide gripping edges for biting into and gripping tightly a rod positioned between said jaws, means for securing the jaws on their respective plates and for adjusting said jaws toward and away from the plates whereby the distance apart of said jaws may be varied to suit rods of different thicknesses, and means for forcing said plates toward each other.

4. In clamping means, spaced clamping plates each provided at one end with an abutment adapted to engage the cross-bar of a cross-head, opposed arcuate gripping jaws carried at the other end of said plates adapted to fit about and grip tightly a rod inserted between the same, said jaws being of approximately V-shape in cross-section and having their apexes directed inwardly to provide gripping edges for biting into and gripping tightly a rod positioned between said jaws, set screws threaded through said plates and into said jaws for adjusting the jaws toward and away from each other, and means for forcing said plates toward each other.

5. In clamping means, spaced plates of approximately T-shape each provided adjacent the base end of its stem with an inwardly projecting shoulder adapted to engage the edge portion of a valve stem cross-head, securing bolts passed through the heads of said plates adjacent each end thereof each having a unit threaded thereon, and opposed clamping jaws mounted on the inner faces of said plates and adapted to fit about and grip tightly frictionally a rod positioned between said jaws when the plates are forced toward each other.

In testimony whereof I affix my signature in presence of two witnesses.

CHARLES F. SINSABAUGH.

Witnesses:
CHESTER A. MUIR,
H. STANLEY WINLACK.

Copies of this patent may be obtained for five cents each, by addressing the "Commissioner of Patents, Washington, D. C."